(12) United States Patent
Beasley (10) Patent No.: US 8,201,574 B2
(45) Date of Patent: Jun. 19, 2012

(54) BI-DIRECTIONAL SEALING BALL VALVE

(75) Inventor: Marvin E. Beasley, Houston, TX (US)

(73) Assignee: Virgo Engineers, Inc., Houston, TX (US)

( * ) Notice: Subject to any disclaimer, the term of this patent is extended or adjusted under 35 U.S.C. 154(b) by 425 days.

(21) Appl. No.: 12/636,617

(22) Filed: Dec. 11, 2009

(65) Prior Publication Data

US 2011/0140025 A1    Jun. 16, 2011

(51) Int. Cl.
*F16K 5/06* (2006.01)

(52) U.S. Cl. .............. 137/15.22; 251/174; 251/181; 251/192; 251/315.01; 251/314

(58) Field of Classification Search .............. 251/174, 251/180–185, 192, 315.01–315.16, 314; 137/15.22

See application file for complete search history.

(56) References Cited

U.S. PATENT DOCUMENTS

| | | | |
|---|---|---|---|
| 3,241,808 A * | 3/1966 | Allen | 251/174 |
| 3,604,682 A * | 9/1971 | Richards | 251/362 |
| 3,834,664 A * | 9/1974 | Atkinson | 251/174 |
| 4,262,688 A * | 4/1981 | Bialkowski | 137/242 |
| 4,318,420 A * | 3/1982 | Calvert | 251/174 |
| 4,319,734 A * | 3/1982 | Acar | 251/174 |
| 4,562,860 A * | 1/1986 | Walter et al. | 137/454.6 |
| 4,602,762 A * | 7/1986 | Koch et al. | 251/174 |
| 4,637,421 A * | 1/1987 | Stunkard | 137/327 |
| 4,673,164 A * | 6/1987 | Nakanishi et al. | 251/174 |
| 4,890,643 A | 1/1990 | Oliver | |
| 4,911,408 A * | 3/1990 | Kemp | 251/174 |
| 5,246,203 A | 9/1993 | McKnight et al. | |
| 5,313,976 A | 5/1994 | Beasley | |
| 6,065,736 A | 5/2000 | Hunt | |
| 6,488,261 B1 | 12/2002 | Lee | |

* cited by examiner

*Primary Examiner* — John Bastianelli
(74) *Attorney, Agent, or Firm* — Osha • Liang LLP (57) ABSTRACT

Embodiments and methods are disclosed herein that relate to a valve assembly. The valve assembly includes a housing having a passage formed therethrough, and a valve ball having a through hole and disposed in the housing, in which the valve ball is rotatable between an open position that has the through hole aligned with the passage and a closed position that has the through hole misaligned with the passage. The valve assembly further includes a seat having a first tapered surface and disposed in the housing adjacent to the valve ball, wherein the seat is biased towards the valve ball, and a seat holder having a second tapered surface and disposed in the housing adjacent to the seat such that the first tapered surface of the seat is disposed adjacent to the second tapered surface of the seat holder.

21 Claims, 5 Drawing Sheets

BI-DIRECTIONAL SEALING BALL VALVE

BACKGROUND OF DISCLOSURE

1. Field of the Disclosure

Embodiments disclosed herein generally relate to methods and assemblies that include a ball valve used to start and stop fluid flow. More specifically, embodiments disclosed herein relate to a valve assembly that uses a ball valve to seal against fluid flow from both the upstream and downstream directions.

2. Background Art

The use of ball valves to start and stop the flow of fluids is well known in the art. Ball valves typically include a valve ball that is located between two seats in the middle of a passage. The valve ball has a through hole, and can be rotated between two positions. U.S. Pat. No. 5,246,203, issued to McKnight et al. ("McKnight"), incorporated by reference in its entirety, discloses an oilfield valve that incorporates a ball valve mechanism. The mechanics of a typical ball valve mechanism are demonstrated in the McKnight patent.

Figure 1A:
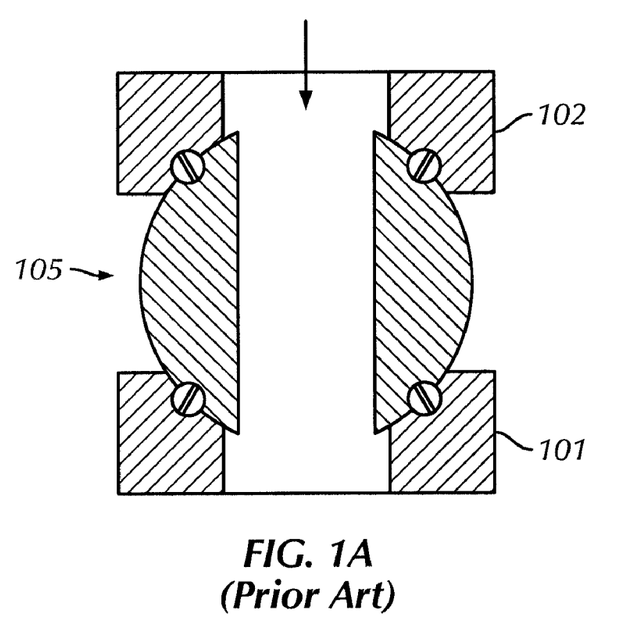
FIGS. 1A and 1B show cross-sectional views of a ball valve assembly.
Figure 1B:
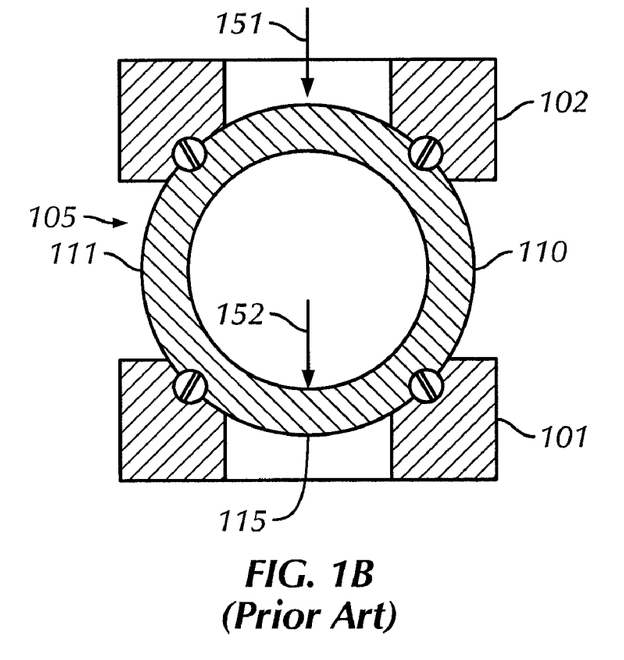

In a first position, as demonstrated in FIG. 1A, the through hole of the valve ball will align with the passage of the pipe or drill string. This position will generally allow complete and undisrupted fluid flow through the passage. The valve ball may then be rotated from this position into a second position, as demonstrated in FIG. 1B, to be misaligned with the passage of the pipe, thereby disrupting fluid flow. Each of the seats surrounding the valve ball, one upper seat and one lower seat, seal against the valve ball, not allowing flow between the valve ball and the seat. Thus, the valve ball, coupled with the two seats sealing against the valve ball, may stop fluid flow through the pipe passage when the valve ball is positioned in the closed position to misalign with the through hole passage by having the seats seal up against the valve ball. In FIG. 1B, a seal is made between the seats, 101 and 102, and the valve ball 105 to completely prohibit flow through the passage. The valve ball has the ability to seal against the seats to be effective against even the highest of pressures, allowing the arrangement to be used as a ball valve.

One issue with this type of ball valve arrangement is that when the valve ball 105 is in the second position, blocking flow through the passage, as seen in FIG. 1B, the valve ball 105 may not be able to effectively seal against the fluid flow, such as both in the upstream and downstream direction. For example, debris comes between the valve ball 105 and the seat 102, only sealing on the downstream seat 101 may be achieved. In such an example, if a fluid force is applied from the downstream direction, the debris may cause the valve to be unable to effectively seal between the valve ball 105 and the seat 102, thereby resulting in a leakage through the ball valve arrangement.

Figure 2:
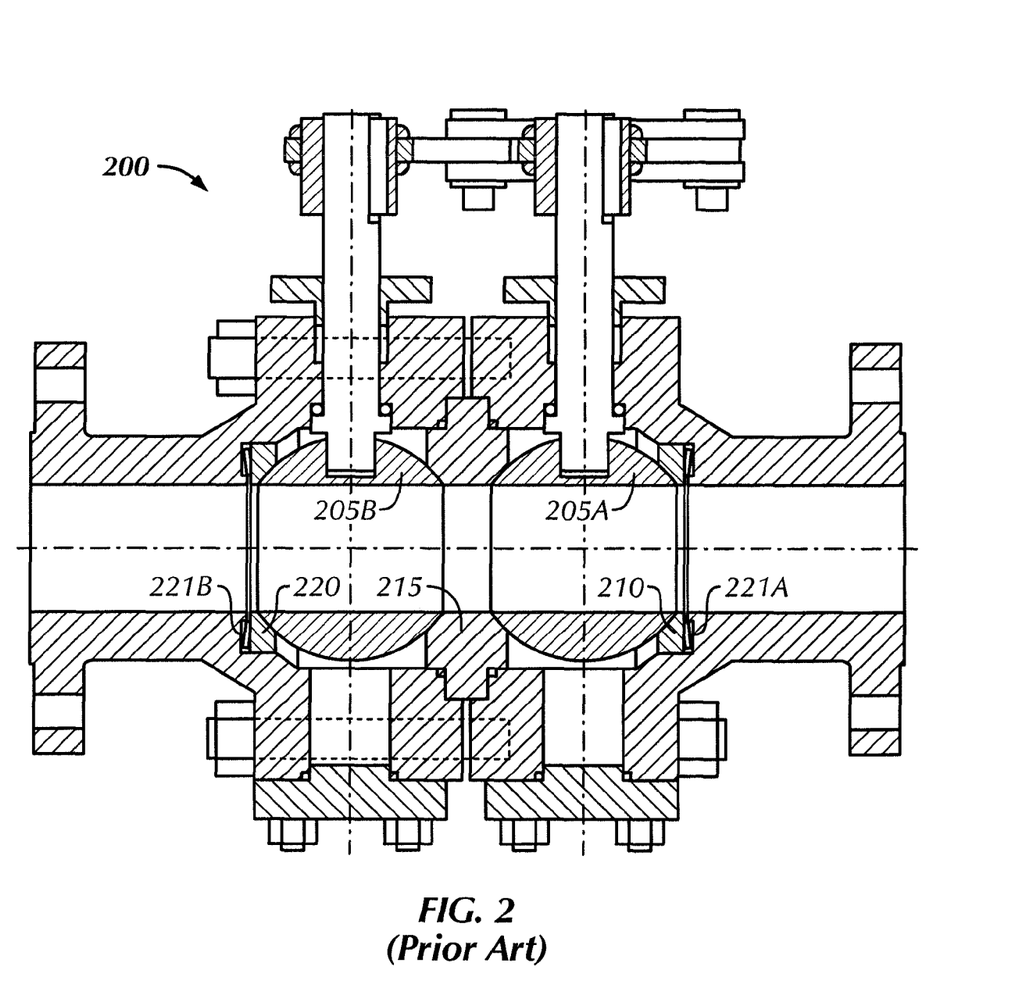
FIG. 2 shows a cross-sectional of a bi-directional dual ball valve assembly.

U.S. Pat. No. 4,890,643, issued to Oliver ("Oliver"), incorporated by reference in its entirety, discloses a bi-directional sealing valve that incorporates ball valve mechanisms. As such, an embodiment disclosed by Oliver is shown in FIG. 2, in which a bi-directional sealing valve 200 includes a first valve ball (upstream valve ball) 205A and a second valve ball (downstream valve ball) 205B. The first valve ball 205A seals against an upper seat 210, the second valve ball 205B seals against a lower seat 220, and both the first valve ball 205A and the second valve ball 205B seal against a middle seat 215 disposed between the first valve ball 205A and the second valve ball 205B. The upper seat 210 is supported by a first spring (upstream spring) 221A, and the lower seat 220 is supported by a second spring (downstream spring) 221B.

When a fluid force is applied from above using the bi-directional sealing valve 200, such as having a downstream fluid force applied thereto, the first valve ball 205A and the second valve ball 205B may be used in combination to inhibit fluid flow through the sealing valve 200. Particularly, when in closed positions, the first valve ball 205A may contact and seal against the middle seat 215, and, if necessary, the second valve ball 205B may translate the fluid force to the lower seat 220 to compress the spring 221B. During compression of the spring 221B, the second valve ball 205B "floats" down to stay in sealing contact with the lower seat 220. Because the middle seat 215 is firmly positioned within the sealing valve 200, the middle seat 215 does not move with second valve ball 205B. The space between the middle seat 215 and the second valve ball 205B provides an opening for the fluid to travel through, in which the fluid then fills up the valve ball 205B. This fluid flow then translates the fluid force to the lower end of the second valve ball 205B into the lower seat 220. This translation of the fluid force is shown in FIG. 1B. As the fluid enters the valve ball 105, the resultant fluid force moves from location 151, on the outer diameter on top of the valve ball 105, to location 152, on the inner diameter inside of the valve ball 105.

In a similar fashion, when a fluid force is applied from below using the bi-directional sealing valve 200, such as having an upstream fluid force applied thereto, the second valve ball 205B may contact and seal against the middle seat 215, and, if necessary, the first valve ball 205A may translate the fluid force to the upper seat 210 to compress the spring 221A.

The sealing valve of Oliver discloses an arrangement that has two valve balls, in which each of the valve balls may be able to float in one of either the upstream direction or the downstream direction, thereby enabling each of the valve balls to seal in one of either the upstream direction or the downstream direction. This structure and arrangement may increase the reliability of the sealing valve in Oliver, as each valve ball only has the responsibility to effectively seal in only one direction (either the upstream direction or the downstream direction).

However, this arrangement in Oliver requires the use of multiple valve balls, thereby increasing the number of components necessary for the sealing valve to be effective. As such, this arrangement may increase the overall cost of the sealing valve, as more components within the valve may be more expensive, may decrease the overall reliability of the sealing valve, as more components within the valve may lead to more surfaces that must correctly seal against fluid flow, and may decrease the overall compatibility and use of the sealing valve, as more components within the valve may change the usual dimensions and increase the overall size of the valve. Accordingly, there exists a need to provide a ball valve assembly that may minimize the overall size and number of components necessary to operate the valve while still being capable of sealing against the flow of fluid, both upstream and downstream.

SUMMARY OF INVENTION

In one aspect, embodiment disclosed herein relate to a valve assembly. The valve assembly includes a housing having a passage formed therethrough, and a valve ball having a through hole and disposed in the housing, in which the valve ball is rotatable between an open position that has the through hole aligned with the passage and a closed position that has the through hole misaligned with the passage. The valve assembly further includes a first seat having a first tapered surface and disposed in the housing adjacent to the valve ball, wherein the first seat is biased towards the valve ball, and a seat holder having a second tapered surface and disposed in the housing adjacent to the first seat such that the first tapered surface of the first seat is disposed adjacent to the second tapered surface of the seat holder.

In another aspect, embodiments disclosed herein relate to another valve assembly. The valve assembly includes a housing having a passage formed therethrough about a first axis, a valve ball having a through hole formed therethrough about a second axis, in which the valve ball is rotatable between an open position that has the first axis of the housing substantially aligned with the second axis of the valve ball and a closed position that has the first axis of the housing substantially misaligned with the second axis of the valve ball, a stem extending through an opening formed in the housing and coupled to the valve ball such that the stem is configured to rotate the valve ball between the open position and the closed position, and a first seat having a first tapered surface and disposed in the housing adjacent to the valve ball on one side of the valve ball. The valve assembly further includes a seat holder having a second tapered surface and disposed in the housing adjacent to the first seat such that the first tapered surface of the first seat is disposed adjacent to the second tapered surface of the seat holder, a biasing mechanism disposed adjacent to the seat holder, wherein the biasing mechanism biases the first seat towards the valve ball, and a second seat disposed on an opposite side of the valve ball with respect to the first seat.

In yet another aspect, embodiments disclosed herein relate to a method to manufacture a valve assembly. The method includes disposing a seat holder having a first tapered surface in a housing, the housing having a passage formed therethrough, disposing a first seat having a second tapered surface in the housing adjacent to the seat holder such that the second tapered surface of the first seat is adjacent to the first tapered surface of the seat holder, and disposing a valve ball having a through hole formed therein in the housing adjacent to the first seat. The first seat is biased towards the valve ball, and the valve ball is rotatable within the housing between an open position that has the through hole aligned with the passage and a closed position that has the through hole misaligned with the passage.

Other aspects and advantages of the invention will be apparent from the following description and the appended claims.

DETAILED DESCRIPTION

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description.

In accordance with various aspects disclosed herein, embodiments disclosed herein generally relate to a valve assembly, and particularly a ball valve assembly, that is used to start and stop fluid flow therethrough. The valve assembly may include a housing having a passage formed therethrough, in which the passage may be formed about a first axis. The valve assembly may further include a valve ball having a through hole formed therethrough, in which the through hole may be formed about a second axis. The valve ball is disposed within the housing such that the valve ball is rotatable between an open position and a closed position within the housing. In the open position, the through hole of the valve ball may align with the passage of the housing, such as by having the second axis of the through hole substantially align with the first axis of the passage, thereby generally enabling fluid flow therethrough. In the closed position, the through hole of the valve ball may substantially misalign with the passage of the housing, such as by having the second axis of the through hole substantially misalign with the first axis of the passage, thereby generally prohibiting fluid flow therethrough.

Further, the valve assembly includes a first seat having a first tapered surface, in which the first seat is disposed within the housing, and includes a seat holder having a second tapered surface disposed in the housing. The first seat and the seat holder are disposed within the housing such that the first tapered surface of the first seat is disposed adjacent to the second tapered surface of the seat holder, the first seat is disposed adjacent to the valve ball, and the first seat is biased towards the valve ball. As such, the first seat may be biased towards the valve ball by using, for example, a biasing mechanism. The biasing mechanism may then be disposed, at least partially, within a groove formed within the seat holder.

The valve assembly may further include a stem, in which the stem extends through an opening formed within the housing. The stem may then be coupled to the valve ball such that the stem is configured to rotate the valve ball between the open position and the closed position within the housing. The valve assembly may also include a second seat, such as an end adapter attached to the housing, such that the second seat is disposed on an opposite side of the valve ball with respect to the first seat. As such, during one direction of fluid flow against the valve ball, the valve ball may be configured to form a metal-to-metal seal with the second seat, and during the other direction of fluid flow against the valve ball, the valve ball may be configured to form a metal-to-metal seal with the first seat.

Figure 3A:
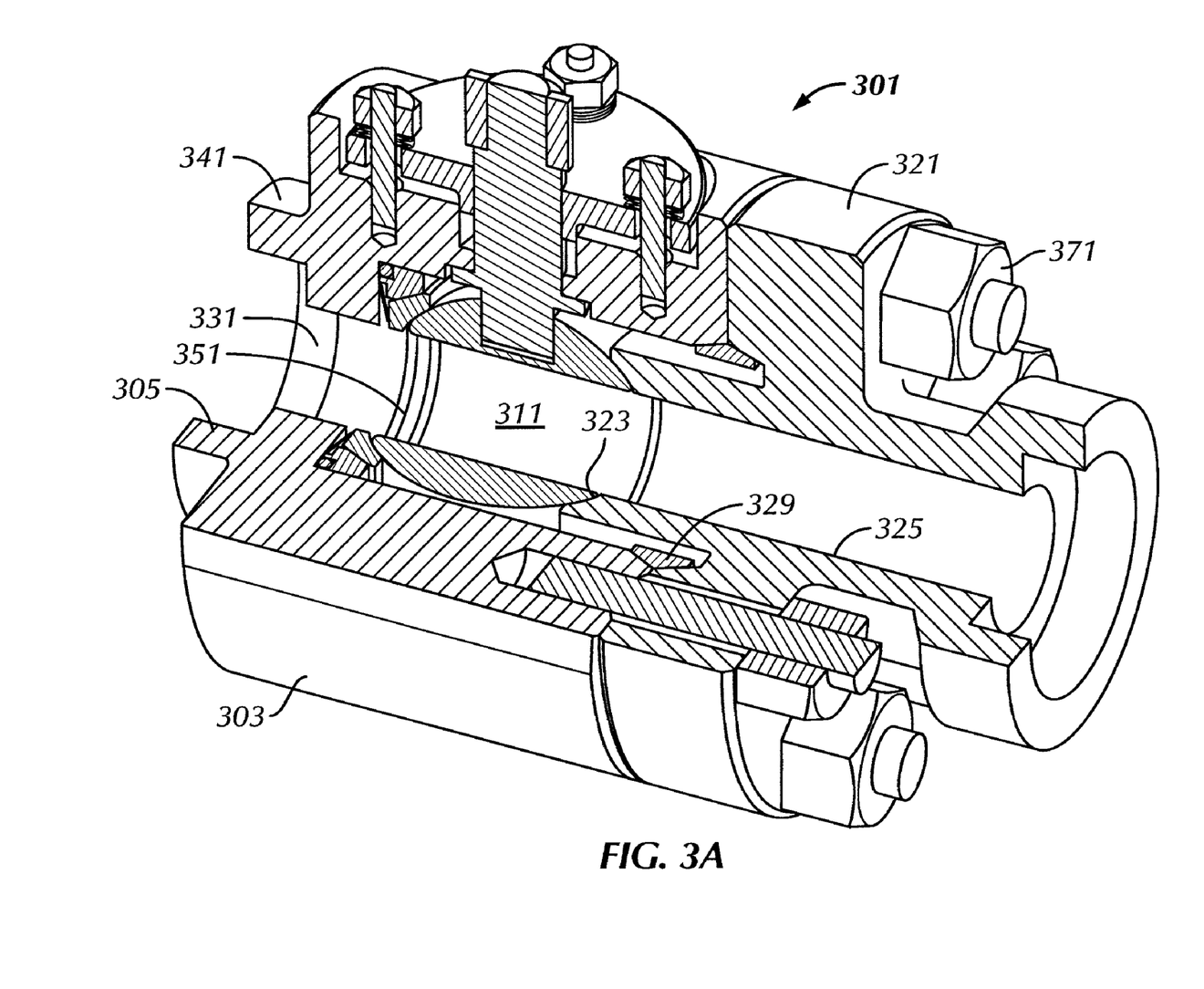
FIGS. 3A-3C show multiple views of a valve assembly in accordance with embodiments disclosed herein.
Figure 3B:
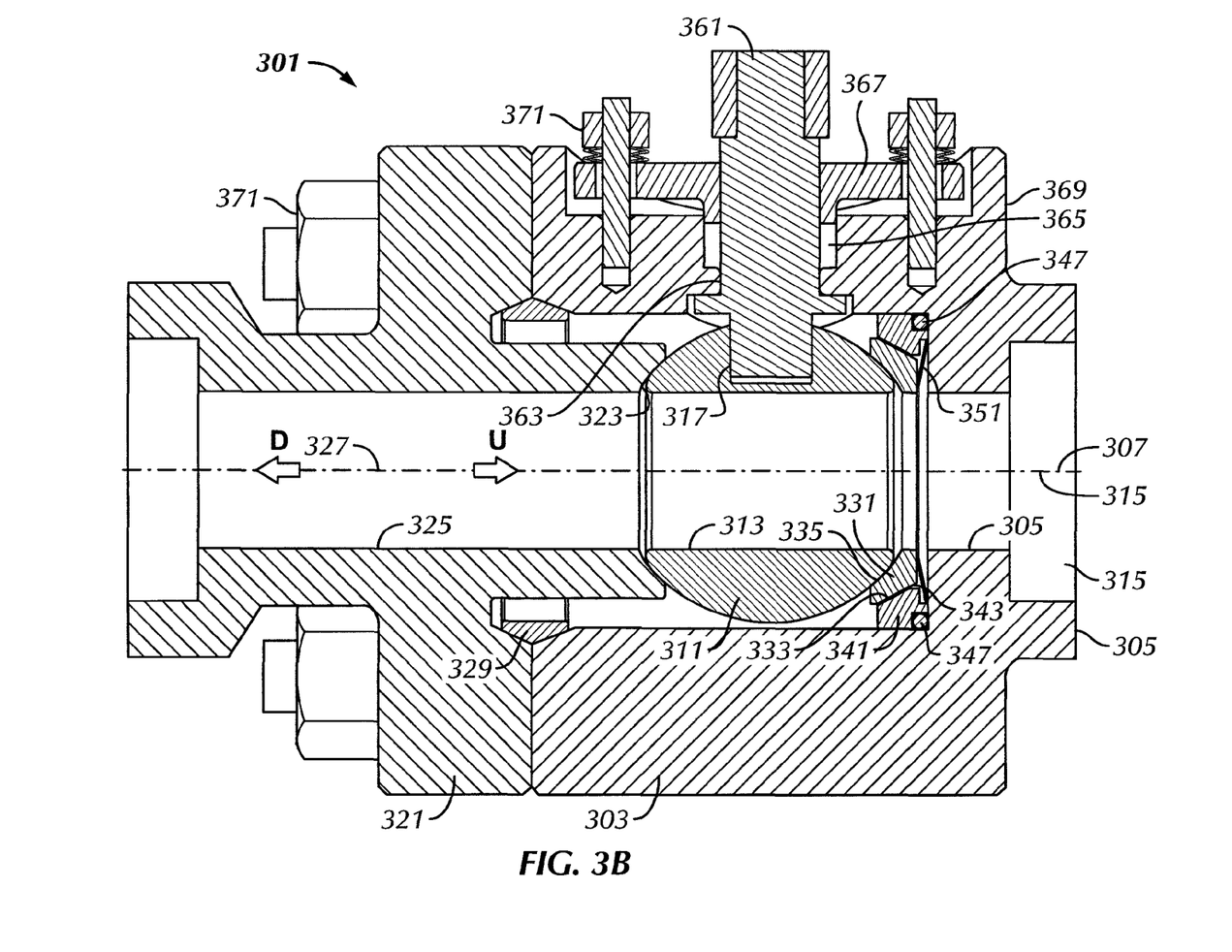
Figure 3C:
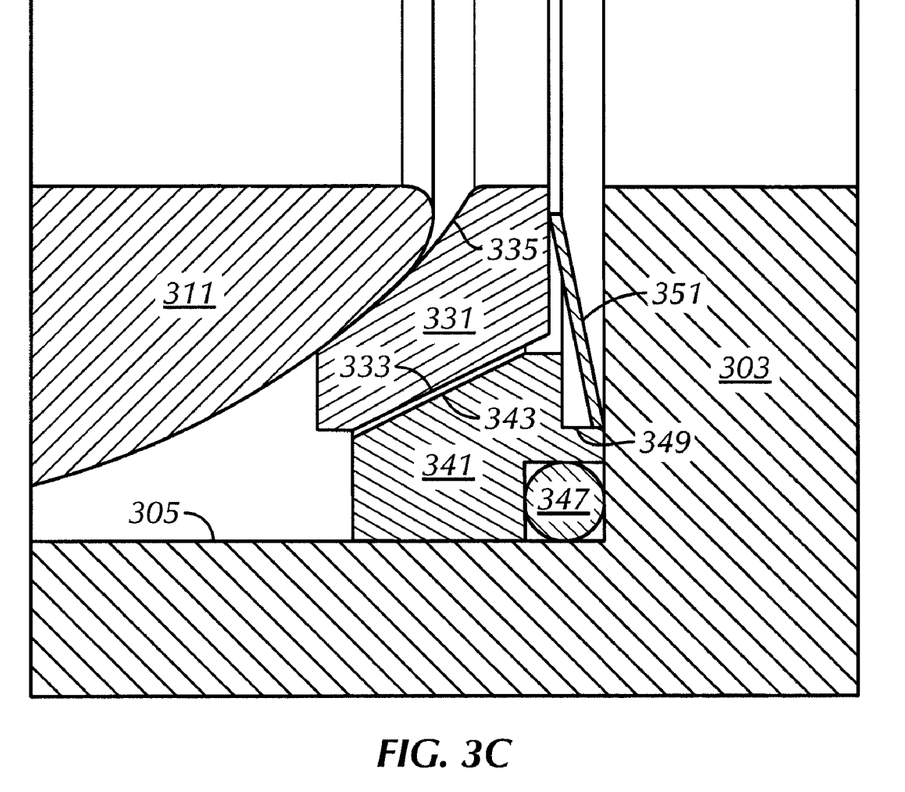

Referring now to FIGS. 3A-3C, multiple views of a valve assembly 301 in accordance with embodiments disclosed herein are shown. Specifically, FIG. 3A shows perspective sectioned view of the valve assembly 301, FIG. 3B shows a cross-sectional view of the valve assembly 301, and FIG. 3C shows a detailed cross-sectional view of a portion of the valve assembly 301.

As shown, the valve assembly 301 includes a housing 303, in which the housing 303 has a passage 305 formed therethrough. Particularly, as shown in FIG. 3B, the passage 305 of the housing 303 may be formed about an axis 307 that extends through the housing 303. As such, and as shown in this embodiment, the passage 305 of the housing 303 may increase and/or decrease in diameter with respect to the axis 307 as the passage 305 extends through the housing 303 along the axis 307.

Further, the valve assembly 301 includes a valve ball 311, in which the valve ball 311 has a through hole 313 formed therethrough. Particularly, as shown in FIG. 3B, the through hole 313 of the valve ball 311 may be formed about an axis 315 that extends through the valve ball 311. As such, the valve ball 311 is disposed within the housing 303 of the valve assembly 301 such that the valve ball 311 is rotatable with respect to the housing 303. Specifically, the valve ball 311 is disposed within the housing 303 such that the valve ball 311 may be rotatable between an open position and a closed position with respect to the housing 303.

In the open position, the through hole 313 of the valve ball 311 may substantially align with the passage 305 of the housing 303, such as by having the axis 315 of the through hole 313 substantially align with the axis 307 of the passage 305. As such, when the valve ball 311 is in the open position, the valve assembly 301 will generally allow and enable fluid flow therethrough. In the closed position, the through hole 313 of the valve ball 311 may substantially misalign with the passage 305 of the housing 303, such as by having the axis 315 of the through hole 313 substantially misalign with the axis 307 of the passage 305. As such, when the valve ball 311 is in the closed position, the valve assembly 301 will generally prohibit fluid flow therethrough.

The valve assembly 301 may further include a second seat 321, such as an end adapter 321, in which the end adapter 321 may be attached to the housing 303. As used herein, the second seat is another seat generally disposed on the opposite of the valve ball with respect to the first seat, in which the second seat may be configured to sealing engage with the valve ball. As such, a second seat may be a fixed seat, as shown, and the second seat may be attached to the housing, as particularly shown with the end adapter. The second seat may also be disposed within the housing, such as similar to the first seat. Further, if desired, the second seat may be configured to be a movable seat, such as similar to the first seat. As such, those having ordinary skill in the art will appreciate that other configurations and arrangements are contemplated for the structure and arrangement of the seats and other components for the valve assembly without departing from the scope of the present disclosure.

Continuing with FIGS. 3A and 3B, the end adapter 321 may be attached to the housing 303 using one or more attachment members 371. For example, as shown in FIGS. 3A and 3B, the attachment members 371 may include bolts. However, those having ordinary skill in the art will appreciate that multiple other attachment members and/or methods may be used to attach the end adapter to the housing, such as by using a screw, an adhesive, and/or a weld, without departing from the scope of the present disclosure. Further, when attaching the end adapter 321 to the housing 303, a sealing member and/or a sealant may be used to provide a seal between the end adapter 321 to the housing 303. For example, as shown in FIGS. 3A and 3B, the valve assembly 301 may include a sealing member 329, such as a sealing gasket, in which the sealing member 329 may be used to provide a seal between the end adapter 321 to the housing 303.

As shown, the end adapter 321 may be attached to one side or end of the housing 303 such that the valve ball 311 may be enclosed within the housing 303 and rotatable between the open position and the closed position. As such, the end adapter 321 is formed such that the end adapter 321 may have sealing contact with the valve ball 311. For example, the end adapter 321 may have a generally rounded arcuate surface 323 that may correspond to the surface of the valve ball 311, thereby enabling the end adapter 321 to develop sealing contact with the valve ball 311. To further develop and improve the sealing contact between the end adapter 321 and the valve ball 311, the end adapter 321 and the valve ball 311 may be mate lapped, such as by hand and/or by a machine process, to enhance the sealing contact between the end adapter 321 and the valve ball 311. As such, the end adapter 321 and the valve ball 311 may develop a metal-to-metal seal for the sealing contact therebetween.

Further, the end adapter 321 may have a passage 325 formed therethrough. Particularly, as shown in FIG. 3B, the passage 325 of the end adapter 321 may be formed about an axis 327 that extends through the end adapter 321. Preferably, the axis 327 of the end adapter 321 aligns with the axis 307 of the housing 303. As such, this may enable fluid to flow through the valve assembly 301, such as when the valve ball 311 is in the open position within the housing 303.

Referring still to FIGS. 3A-3C, the valve assembly 301 includes a first seat 331 and a seat holder 341. As shown, the first seat 331 and the seat holder 341 are disposed within the housing 303 of the valve assembly, in which the first seat 331 may be disposed adjacent to the valve ball 311 and the seat holder 341 may be disposed adjacent to the first seat 331. Particularly, the first seat 331 may be disposed within the valve assembly 301 between the valve ball 311 and the seat holder 341, and the seat holder 341 may be disposed within the valve assembly 301 between the first seat 331 and the housing 303.

As shown, the first seat 331 and the seat holder 341 may each have a tapered surface formed thereon. For example, the first seat 331 may include a tapered surface 333, and the seat holder 341 may include a tapered surface 343. The tapered surface 333 of the first seat 331 and the tapered surface 343 of the seat holder 341 are each tapered with respect to the axis 307 extending through the housing 303. As such, the tapered surface 333 of the first seat 331 and the tapered surface 343 of the seat holder 341 may each have substantially the same tapered angle with respect to the axis 307 of the housing 303. For example, the tapered surface 333 of the first seat 331 and the tapered surface 343 of the seat holder 341 may each have the same tapered angle with respect to the axis 307 of the housing 303 within a tolerance of about 10 percent, at least. As such, having substantially the same tapered angle may enable the tapered surface 333 of the first seat 331 and the tapered surface 343 of the seat holder 341 to contact each other, and particularly have sealing contact therebetween.

For example, as the tapered surface 333 of the first seat 331 and the tapered surface 343 of the seat holder 341 come into contact and may have substantially the same tapered angle with respect to the axis 307 of the housing 303, the tapered surfaces 333 and 343 may develop sealing contact therebetween. The tapered angle of the tapered surface 333 of the first seat 331 and the tapered surface 343 of the seat holder 341 may each be between a range of about 5 degrees and about 45 degrees with respect to the axis 307 of the housing 303. More specifically, the tapered angle of the tapered surface 333 of the first seat 331 and the tapered surface 343 of the seat holder 341 may each be about 30 degrees with respect to the axis 307 of the housing 303. As such, using a tapered angle between the range provided above may prevent the seat from "sticking" with the seat holder, in which the seat may become wedged into contact with the seat holder.

Further, the first seat 331 may be formed such that the first seat 331 may have sealing contact with the valve ball 311. For example, the first seat 331 may have a generally rounded arcuate surface 335 that may correspond to the surface of the valve ball 311. As such, this may enable the first seat 331 to develop sealing contact with the valve ball 311. Furthermore, the seat holder 341 may be formed such that the seat holder 341 has sealing contact with the housing 303. For example, the seat holder 341 may form a static circumferential seal between one of the sides of the seat holder 341 and the housing 303. A groove 345, as shown in FIG. 3B particularly, may also be formed with the seat holder 341, in which a sealing member 347, such as a grafoil seal or other sealing member known in the art, may be disposed within the groove 345 of the seat holder 341. As such, the sealing member 347 may provide an additional, or alternative, seal between the seat holder 341 and the housing 303.

As discussed above, the second seat (e.g., end adapter) and the valve ball may be mate lapped, such as by hand and/or by a machine process, to enhance the sealing contact between the end adapter and the valve ball. As such, in addition to the surfaces between the end adapter and the valve ball, other components and/or surfaces of the valve assembly may additionally or alternatively be mate lapped to enhance the sealing contact between the components and surfaces of the valve assembly. For example, the tapered surface 333 of the first seat 331 and the tapered surface 343 of the seat holder 341 may be mate lapped to enhance the sealing contact therebetween, the rounded arcuate surface 335 of the first seat 331 and the corresponding surface of the valve ball 311 may be mate lapped to enhance the sealing contact therebetween, and/or the sealing surface of the seat holder 341 and corresponding surface of the housing 303 may be mate lapped to enhance the sealing contact therebetween. As such, if desired, mate lapping sealing surfaces of the valve assembly may enhance the metal-to-metal seals formed within the valve assembly.

Further, one or more components within the valve assembly may be coated, such as having a hard coating formed thereon or applied thereto. For example, at least a portion of the valve ball, housing, first seat, seat holder, and/or second seat may have a hard coating disposed thereon. This hard coating may be used to increase strength, durability, and/or wear resistance of the components the hard coating is applied upon. As such, one or more components of the valve assembly, such as within one or more of the metal-to-metal seals, may have a hard coating applied thereto. Further, in accordance with embodiments of the present disclosure, a metal-to-metal seal may include a coating, such as a hard coating, carbide coating, or any other coating known in the art, and/or may include alternative materials disposed thereon and/or disposed therebetween one or more components of the present disclosure. As such, the present disclosure contemplates the use of multiple coatings and/or materials therein in accordance with one or more embodiments disclosed herein.

The valve assembly 301 may further include a biasing mechanism 351, in which the biasing mechanism 351 may be used to bias the first seat 331 towards the valve ball 311. The biasing mechanism 351 may be disposed within the housing 303 of the valve assembly 301, and specifically disposed between the first seat 331 and the housing 303 of the valve assembly 301. For example, as shown particularly in FIG. 3C, the seat holder 341 may have a groove 349 formed therein, in which the biasing mechanism 351 may be disposed, at least partially, within the groove 349 formed within the seat holder 341. This arrangement may enable the biasing mechanism 351 to be positioned between the housing 303 of the valve assembly 301 and the first seat 331, enabling the biasing mechanism 351 to push against the housing 303 and bias the first seat 331 towards the valve ball 311. The biasing mechanism 351 may be, for example, a Bellville washer, as shown. However, those having ordinary skill in the art will appreciate that any other biasing mechanism may be used within the valve assembly, such as a spring and/or an elastomeric member, without departing from the scope of the present disclosure. Further, the biasing mechanism is shown as disposed between the seat and the housing in FIGS. 3A-3C. However, those having ordinary skill in the art will appreciate that other arrangements may be used to bias the seat towards the valve ball in accordance with embodiments disclosed herein without departing from the scope of the present disclosure.

Referring still to FIGS. 3A-3C, the valve assembly 301 may include a stem 361. As shown, the stem 361 may extend through an opening 363 formed within the housing 303 of the valve assembly 301. Particularly, the stem 361 may extend through the opening 363 to couple to the valve ball 311 of the valve assembly 301, in which the stem 361 may be used to rotate the valve ball 311, such as rotate the valve ball 311 between the open position and the closed position with respect to the housing 303. For example, as shown, the valve ball 311 may have a recess 317 formed therein, in which the stem 361 may extend into and engage the recess 317 of the valve ball 311 to rotate the valve ball 311 between the open position and the closed position. As such, the stem 361 may be used to engage and rotate the valve ball 311 from the exterior of the housing 303 as the valve ball 311 is disposed within the housing 303.

The valve assembly 301 may also include one or more sealing members 365 and a plate 367 disposed adjacent to the stem 361, in which the sealing members 365 and the plate 367 may be used to stabilize and/or provide a seal about the stem 361. For example, as shown in FIGS. 3A and 3B, the housing 303 may have a recess 369 formed therein adjacent to the opening 363, in which the sealing members 365 may be disposed within the recess 369 about the stem 361 extending through the recess 369 and opening 363 into the housing 303. These sealing members 365, which may be packing members as shown, or any other sealing member known in the art (as discussed above), may provide a seal between the stem 363 and the housing 303.

Further, the plate 367 may be disposed about the stem 361 and adjacent to the sealing members 365, in which one or more attachment members 371 may be used to attach the plate 367 to the housing 303. For example, as shown in FIGS. 3A and 3B, the attachment members 371, which may be bolts as shown, or any other attachment member known in the art (as discussed above), may be used to attach the plate 367 to the housing 303, and further may be used to apply pressure to the sealing members 365 through the plate 367. Particularly, as shown, the attachment members 371 may be selectively tightened, if desired, to apply pressure to the sealing members 365 using the plate 367, thereby adjusting the sealing properties of the sealing members 365 as desired.

As discussed above, the valve ball 311 of the valve assembly 301 is rotatable between an open position and a closed position, in which the valve ball 311 enables fluid flow therethrough in the open position and inhibits fluid flow therethrough in the closed position. As such, when the valve ball 311 is in the closed position, the valve assembly 301 may be used to inhibit the fluid flow therethrough in the downstream direction, as shown with direction arrow D in FIG. 3B, in addition to the upstream direction, as with direction arrow U in FIG. 3B.

When the valve assembly 301 is used to inhibit fluid flow in the downstream direction D, the valve ball 311 is in the closed position and is in sealing contact with the surface 323 of the end adapter 321. For example, while the valve ball 311 is in the closed position, fluid may enter, at least partially, into the passage 305 of the housing 303, past the biasing mechanism 351 and the tapered surfaces 333 and 343, and may enter into the through hole 313 of the valve ball 313. Fluid may then apply a fluid force upon the valve ball 313 against the through hole 313 in the downstream direction D. This fluid force may apply a force to the valve ball 313 that enables the sealing contact between the valve ball 313 and the surface 323 of the end adapter 321.

Further, in addition to fluid applying a force to the valve ball 311 in the downstream direction D, the first seat 331 is also biased towards the valve ball 311, such as biased by the biasing mechanism 351. As the biasing mechanism 351 applies a biasing force against the first seat 331, this biasing force may be translated through the first seat 331 and through the valve ball 311, thereby biasing the valve ball 311 into sealing contact with the surface 323 of the end adapter 321. As such, one or both of these forces may be used to enable and/or assist sealing contact between the valve ball 311 and the surface 323 of the end adapter 321 to inhibit fluid flow through the valve assembly 301 in the downstream direction D.

When the valve assembly 301 is used to inhibit fluid flow in the upstream direction U, the valve ball 311 is still in the closed position, and multiple surfaces may be used to develop sealing contact and inhibit fluid flow through the valve assembly 301. For example, while the valve ball 311 is in the closed position, fluid may enter into the passage 325 of the end adapter 321. As the valve ball 311 is biased into sealing contact with the surface 323 of the end adapter 321, this sealing contact may inhibit fluid flow through the valve assembly 301. However, as the upstream fluid force increases, the upstream fluid force may overcome the biasing force applied against the valve ball 311. As such, once the fluid force overcomes this biasing force, the valve ball 311 may move, at least partially, in the upstream direction U along the axis 307 of the housing 303.

As the valve ball 311 moves, the valve ball 311 may lose sealing contact with the surface 323 of the end adapter 321. However, fluid may then enter the passage 313 of the valve ball 311, in which the upstream fluid force may push the valve ball 311 into sealing contact with the first seat 331, if sealing contact has not already been established, and the upstream force may also push the first seat 331 into sealing contact with the seat holder 341. Specifically, the fluid force may be used to push the tapered surface 333 of the first seat 331 into sealing contact with the tapered surface 343 of the seat holder 341, thereby enabling the valve ball 311 to have sealing contact with the first seat 331 and the first seat 331 to have sealing contact with the seat holder 341. As such, as the seat holder 341 may have sealing contact with the housing 303, such as through the seat holder 341 having a static circumferential seal with the housing 303 and/or through the sealing member 347 (both as discussed above), the housing 303, the seat holder 341, the first seat 331, and the valve ball 311 may each have sealing contact therebetween to inhibit fluid flow through the valve assembly 301 in the upstream direction U. Further, as the tapered surface 333 of the first seat 331 comes into sealing contact with the tapered surface 343 of the seat holder 341, in accordance with one or more embodiments disclosed herein, the tapered surfaces 333 and 343 may develop a "wiping" action therebetween. This action may enable the tapered surfaces 333 and 343 to remove matter that may have developed or accumulated between the tapered surfaces 333 and 343.

In embodiments in which the valve assembly includes a biasing mechanism, such as a Bellville washer, the biasing mechanism may be disposed within the housing in a partially compressed state. For example, with reference to FIGS. 3B and 3C, the biasing mechanism 351 may be partially compressed such that the biasing mechanism 351 may apply a biasing force against the first seat 331. As such, this may enable the first seat 331 to translate and apply the biasing force against the valve ball 311. Further, the seat, the seat holder, and/or the housing may be formed such that as the valve assembly is in the closed position and inhibits fluid flow in the upstream direction, the biasing mechanism is protected from excessive fluid forces, thereby preventing damage to the biasing mechanism. For example, with reference to FIGS. 3B and 3C, the biasing mechanism 351 may be disposed, at least partially, within the groove 349 of the seat holder 341. As such, as the first seat 331 moves towards the seat holder 341, thereby applying a force and compressing the biasing mechanism 351, the first seat 331 stops moving once sealing contact is established with the seat holder 341. As such, this arrangement may prevent the biasing mechanism 351 from being over compressed, thereby preserving the biasing force established by the biasing mechanism 351.

Embodiments of the present disclosure may have one or more of the following advantages. First, embodiments disclosed herein may provide for an assembly that may be used to inhibit fluid flow in both the downstream and the upstream direction. As such, this bi-directional sealing capability of the valve assembly may increase the functionality and reliability of the assembly to seal in the upstream direction. Next, embodiments disclosed herein may provide for an assembly that seals in the upstream and downstream direction using one or more metal-to-metal seals. As such, these metal-to-metal seals may increase the reliability and longevity of the valve assembly, as metal-to-metal seals may not be as subject to corrosion, abrasion, and/or leakage during use.

Further, embodiments in accordance with the present disclosure may be designed such as to replace one or more components of existing valve assemblies. For example, an existing valve assembly having a valve body, a first seat, a valve ball, a second seat (e.g., end adapter), and a biasing mechanism may have one or more components replaced. Particularly, the seat and the biasing mechanism in such an embodiment may be replaced with a spring, a seat, and a seat holder in accordance with embodiments of the present disclosure. As such, this may enable existing valve assemblies to be modified such that the valve assembly may have bi-directional sealing capability and inhibit fluid flow in both the downstream and upstream directions.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the invention should be limited only by the attached claims.

What is claimed is:

1. A method to manufacture a valve assembly, the method comprising:
   disposing a static seat holder having a first tapered surface in a housing, the housing having a passage formed therethrough;
   disposing a first seat having a second tapered surface in the housing adjacent to the seat holder such that the second tapered surface of the first seat is adjacent to for making contact with the first tapered surface of the seat holder;
   disposing a valve ball having a through hole formed therein in the housing adjacent to the first seat, wherein the first seat is biased towards the valve ball, wherein the valve ball is rotatable within the housing between an open position that has the through hole aligned with the passage and a closed position that has the through hole misaligned with the passage; and disposing a biasing mechanism, at least partially, within a groove formed within the seat holder such that the biasing mechanism biases the first seat towards the valve ball.

2. The method of claim 1, further comprising:
disposing a stem through an opening formed in the housing and coupling the stem to the valve ball such that the stem is configured to rotate the valve ball between the open position and the closed position; and
disposing a second seat on an opposite side of the valve ball with respect to the first seat.

3. The method of claim 2, wherein, during one direction of fluid flow, the valve ball is configured to form a metal-to-metal seal with the second seat, and during the other direction of fluid flow, the valve ball is configured to form a metal-to-metal seal with the first seat and the first tapered surface and the second tapered surface are configured to form a seal therebetween.

4. The method of claim 1, wherein the first tapered surface and the second tapered surface each comprise a tapered angle between about 5 degrees and about 45 degrees with respect to an axis extending through the housing.

5. The method of claim 4, wherein the second seat comprises an end adapter, wherein the end adapter is attached to the housing.

6. A valve assembly comprising:
a housing having a passage formed therethrough;
a valve ball having a through hole and disposed in the housing, wherein the valve ball is rotatable between an open position that has the through hole aligned with the passage and a closed position that has the through hole misaligned with the passage;
a first seat having a first tapered surface and disposed in the housing adjacent to the valve ball, wherein the first seat is biased towards the valve ball;
a static seat holder having a second tapered surface and disposed in the housing adjacent to the first seat such that the first tapered surface of the first seat is disposed adjacent to for making contact with the second tapered surface of the seat holder; and
a biasing mechanism disposed, at least partially, within a groove formed within the seat holder, wherein the biasing mechanism biases the first seat towards the valve ball.

7. The valve assembly of claim 6, wherein the biasing mechanism comprises a Bellville washer.

8. The valve assembly of claim 6, wherein the seat holder has a groove formed therein such that a sealing element is disposed within the groove between the seat holder and the housing.

9. The valve assembly of claim 6, wherein the first tapered surface of the first seat and the second tapered surface of the seat holder each comprise substantially the same tapered angle with respect to an axis extending through the housing.

10. The valve assembly of claim 9, wherein the first tapered surface and the second tapered surface each comprise a tapered angle between about 5 degrees and about 45 degrees with respect to the axis extending through the housing.

11. The valve assembly of claim 10, wherein the first tapered surface and the second tapered surface each comprise a tapered angle of about 30 degrees with respect to the axis extending through the housing.

12. The valve assembly of claim 6, wherein a metal-to-metal seal is formed between the seat holder and the housing.

13. The valve assembly of claim 6, wherein the first tapered surface of the first seat and the second tapered surface of the seat holder are configured to form a seal therebetween.

14. The valve assembly of claim 6, further comprising:
a second seat, wherein the second seat is disposed on an opposite side of the valve ball with respect to the first seat,
wherein, during one direction of fluid flow, the valve ball is configured to form a metal-to-metal seal with the second seat, and during another direction of fluid flow, the valve ball is configured to form a metal-to-metal seal with the first seat.

15. The valve assembly of claim 14, wherein the second seat comprises an end adapter, wherein the end adapter is attached to the housing.

16. A valve assembly comprising:
a housing having a passage formed therethrough about a first axis;
a valve ball having a through hole formed therethrough about a second axis, wherein the valve ball is rotatable between an open position that has the first axis of the housing substantially aligned with the second axis of the valve ball and a closed position that has the first axis of the housing substantially misaligned with the second axis of the valve ball;
a stem extending through an opening formed in the housing and coupled to the valve ball such that the stem is configured to rotate the valve ball between the open position and the closed position;
a first seat having a first tapered surface and disposed in the housing adjacent to the valve ball on one side of the valve ball;
a static seat holder having a second tapered surface and disposed in the housing adjacent to the first seat such that the first tapered surface of the first seat is disposed adjacent to for making contact with the second tapered surface of the seat holder;
a biasing mechanism disposed adjacent to the seat holder, wherein the biasing mechanism biases the first seat towards the valve ball;
a second seat disposed on an opposite side of the valve ball with respect to the first seat; and
a biasing mechanism disposed, at least partially, within a groove formed within the seat holder, wherein the biasing mechanism biases the first seat towards the valve ball.

17. The valve assembly of claim 16, wherein, during one direction of fluid flow, the valve ball is configured to form a metal-to-metal seal with the second seat, and during another direction of fluid flow, the valve ball is configured to form a metal-to-metal seal with the first seat.

18. The valve assembly of claim 17, wherein, during the other direction of fluid flow, the first tapered surface of the first seat and the second tapered surface of the seat holder are configured to form a seal therebetween.

19. The valve assembly of claim 16, wherein a metal-to-metal seal is formed between the seat holder and the housing.

20. The valve assembly of claim 16, wherein the first tapered surface and the second tapered surface each comprise a tapered angle between about 5 degrees and about 45 degrees with respect to the first axis of the housing.

21. The valve assembly of claim 16, wherein the second seat comprises an end adapter, wherein the end adapter is attached to the housing.

* * * * *